(12) United States Patent
Watts

(10) Patent No.: US 7,405,536 B2
(45) Date of Patent: Jul. 29, 2008

(54) BATTERY PACK-DETECTING CHARGER

(75) Inventor: Fred S. Watts, New Freedom, PA (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 11/398,697

(22) Filed: Apr. 5, 2006

(65) Prior Publication Data

US 2006/0176013 A1 Aug. 10, 2006

Related U.S. Application Data

(63) Continuation of application No. PCT/US2004/032838, filed on Oct. 6, 2004.

(60) Provisional application No. 60/509,453, filed on Oct. 8, 2003.

(51) Int. Cl.
*H01M 10/46* (2006.01)

(52) U.S. Cl. .................................. 320/106; 320/DIG. 12

(58) Field of Classification Search .................. 320/106, 320/110, 141, DIG. 12
See application file for complete search history.

(56) References Cited

U.S. PATENT DOCUMENTS

| | | | |
|---|---|---|---|
| 5,694,024 A * | 12/1997 | Dias et al. | 320/106 |
| 5,808,447 A | 9/1998 | Hagino | |
| 6,420,854 B1 * | 7/2002 | Hughes et al. | 320/165 |
| 6,577,883 B1 | 6/2003 | Ueda | |
| 6,823,274 B2 * | 11/2004 | Zimmerman et al. | 702/63 |
| 6,931,332 B2 * | 8/2005 | Phansalkar et al. | 702/63 |
| 7,170,257 B2 * | 1/2007 | Oh | 320/106 |
| 2003/0094924 A1 * | 5/2003 | Oh | 320/128 |

FOREIGN PATENT DOCUMENTS

| | | |
|---|---|---|
| EP | 0865140 A1 | 9/1998 |
| EP | 1 337 025 A2 | 8/2003 |
| EP | 1 341 286 A2 | 9/2003 |
| WO | WO 02/37128 A2 | 5/2002 |

OTHER PUBLICATIONS

Translation of an Office Action from the Chinese Patent Office, no date.
W. Zeng, European Search Report, Dec. 16, 2004, Munich, Germany. Annex to the European Search Report on European Patent Application No. EP 04 02 3921.

* cited by examiner

*Primary Examiner*—Edward Tso
(74) *Attorney, Agent, or Firm*—Adan Ayala

(57) ABSTRACT

A charger having a controller with an input and an output, a first terminal for connecting a battery pack to the controller, a connecting line disposed between the first terminal and the input of the controller, a current source connected to the controller for providing power to the battery pack. The current source provides power to the battery pack via the connecting line. The controller sends a pulse signal unto the connecting line via the output, so that the controller can determine whether the battery pack is connected to the charger by the presence of the pulse signal in the input of the controller.

13 Claims, 2 Drawing Sheets

BATTERY PACK-DETECTING CHARGER

This application is a continuation of PCT Application No. 2004/32838, filed Oct. 6, 2004, which in turn derives priority under 35 USC § 119(e) from U.S. application Ser. No. 60/509,453, filed Oct. 8, 2003.

FIELD OF THE INVENTION

This invention relates generally to battery chargers and more particularly to battery chargers with protection circuitry.

BACKGROUND OF THE INVENTION

The battery packs for portable power tools, outdoor tools and certain kitchen and domestic appliances may include rechargeable batteries, such as lithium, nickel cadmium, nickel metal hydride and lead-acid batteries, so that they can be recharged rather than be replaced. Thereby a substantial cost saving is achieved.

It is preferable to provide a charger that recognizes when a battery pack has been connected in order to begin charging.

SUMMARY OF THE INVENTION

In accordance with the present invention, an improved battery pack charger is employed. The charger includes a controller having an input and an output, a first terminal for connecting a battery pack to the controller, a connecting line disposed between the first terminal and the input of the controller, a current source connected to the controller for providing power to the battery pack, the current source providing the power to the battery pack via the connecting line, wherein the controller sends a pulse signal unto the connecting line via the output, whereby the controller determines whether the battery pack is connected to the charger by the presence of the pulse signal in the input of the controller.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which.

DETAILED DESCRIPTION

The invention is now described with reference to the accompanying figures, wherein like numerals designate like parts.

Figure 1:
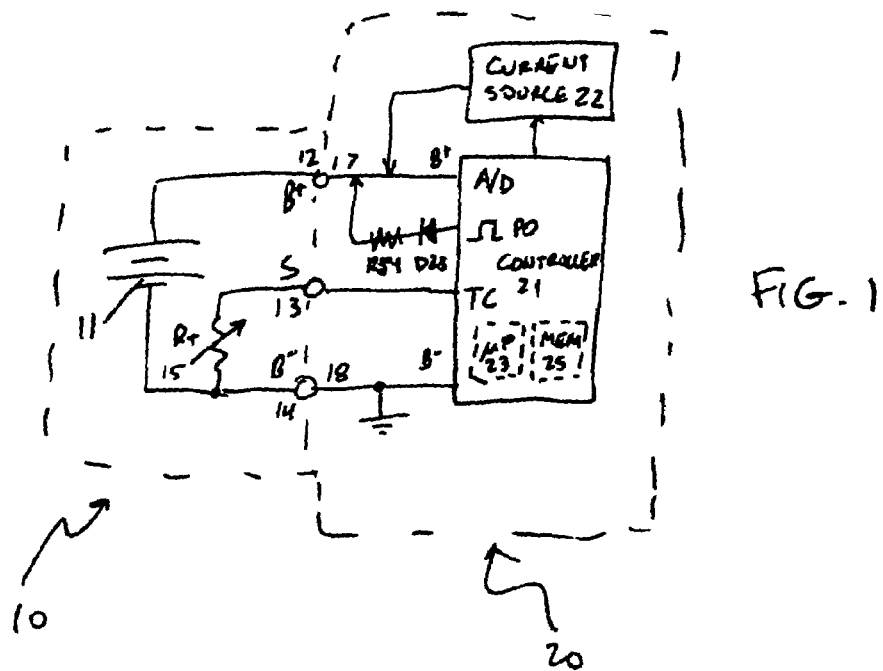
FIG. 1 is a simplified block diagram of a battery pack and charger.
Figure 2:
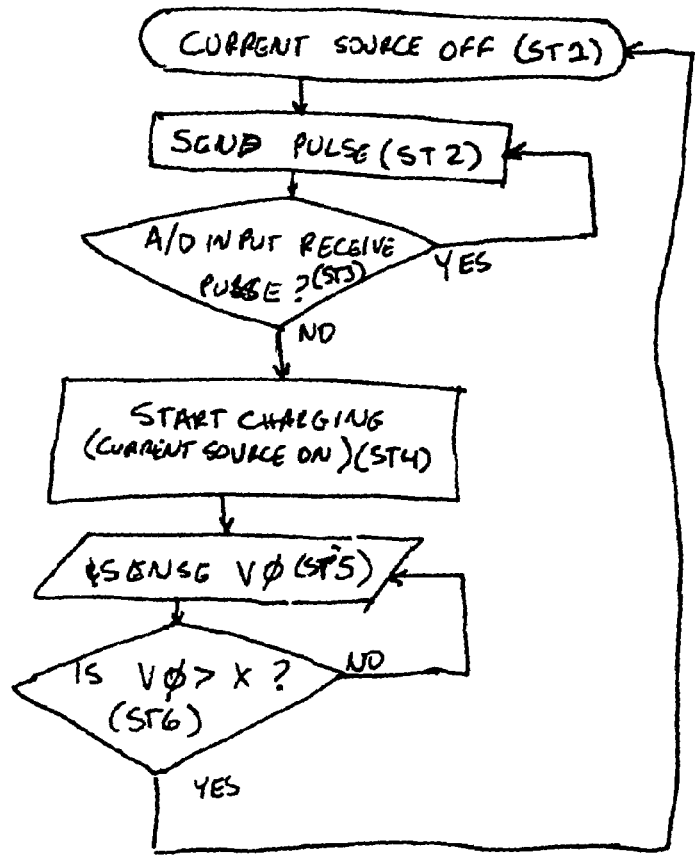
FIG. 2 is a flowchart showing a method according to the present invention.

Referring to FIGS. 1-2, a battery pack 10 is connected to a charger 20. Battery pack 10 may comprise a plurality of battery cells 11 connected in series and/or parallel, which dictate the voltage and storage capacity for battery pack 10. Battery pack 10 may include three battery contacts: first battery contact 12, second battery contact 13, and third battery contact 14. Battery contact 12 is the B+ (positive) terminal for battery pack 10. Battery contact 14 is the B− or negative/common terminal. Battery contact 13 is the S or sensing terminal. Battery contacts 12 and 14 receive the charging current sent from the charger 20 (preferably from current source 22, as discussed below) for charging the battery pack 10.

As shown in FIG. 1, the battery cells 11 are connected between the battery contacts 12 and 14. In addition, preferably connected between battery contacts 13 and 14 is a temperature sensing device 15, such as a negative temperature co-efficient (NTC) resistor, or thermistor, $R_T$. The temperature sensing device is preferably in closer proximity to the cells 11 for monitoring of the battery temperature. Persons skilled in the art will recognize that other components, such as capacitors, etc., or circuits can be used to provide a signal representative of the battery temperature.

The charger 20 preferably comprises a controller 21, which in turn includes positive terminal (B+) 17 and negative (B−) terminal 18, which are coupled to battery pack 10 via battery contacts 12 and 14, respectively. The positive terminal may also act as an input, preferably an analog/digital input A/D, in order for the controller 21 to detect the battery pack voltage. In addition, the controller 21 may include another input TC, preferably an analog/digital input, which is coupled to the temperature sensing device 15 via the third battery contact 13 (S). This allows the controller 21 to monitor the battery temperature.

Controller 21 may include a microprocessor 23 for controlling the charging and monitoring operations. Controller 21 may control a charging power source for providing power to the battery pack 10, such as current source 22 that provides current to battery pack 10. This current may be a fast charging current and/or an equalization current. Current source 22 may be integrated within controller 21.

Controller 21 may have a memory 25 for storing data. Memory 25 may be integrated within controller 21 and/or microprocessor 23.

Controller 21 preferably has a pulse output PO, which sends a pulse signal unto the same line that sends power to the battery pack 10. The pulse signal may have an amplitude of 5 volts. Preferably the pulse signal generated by the controller 21 goes through a diode D23 and/or a resistor R54.

With such arrangement, controller 21 can determine whether a battery pack 10 has been connected to the charger 20. FIG. 2 is a flowchart illustrating the process for determining whether a battery pack 10 has been connected to the charger 20.

First, the current source 22 must be off (ST1). The controller 21 then sends a pulse signal via pulse output PO (ST2).

The controller 21 then checks whether the input A/D has received a pulse (ST3). If a pulse was received, a battery pack 10 is not connected to the charger 20.

On the other hand, if a pulse was not received, the controller 21 would interpret this to mean that a battery pack 10 is connected to the charger 20. Persons skilled in the art will recognize that the voltage at input A/D will be substantially constant since resistor R54 and diode D23 will not allow a significant current to generate an AC signal across the battery. Since the pulse was not received, controller 21 would then start charging battery pack 10 by turning on current source 22 (ST4).

Controller 21 then senses the battery voltage V0 via input A/D (ST5). Controller 21 compares battery voltage V0 to a certain threshold X (ST6). If battery voltage V0 is below threshold X, charging continues and controller 21 continues to sense and compare the battery voltage V0.

If battery voltage V0 exceeds (or is equal to) threshold X, controller 21 then assumes that the battery pack 10 has been removed from charger 20 and stops charging by turning the current source off. Persons skilled in the art will recognize that it is preferable to provide a relatively high threshold so as to not prematurely terminate charging, resulting in an undercharged battery pack. Accordingly, it is preferable to provide a threshold of at least 30 volts.

Figure 3:
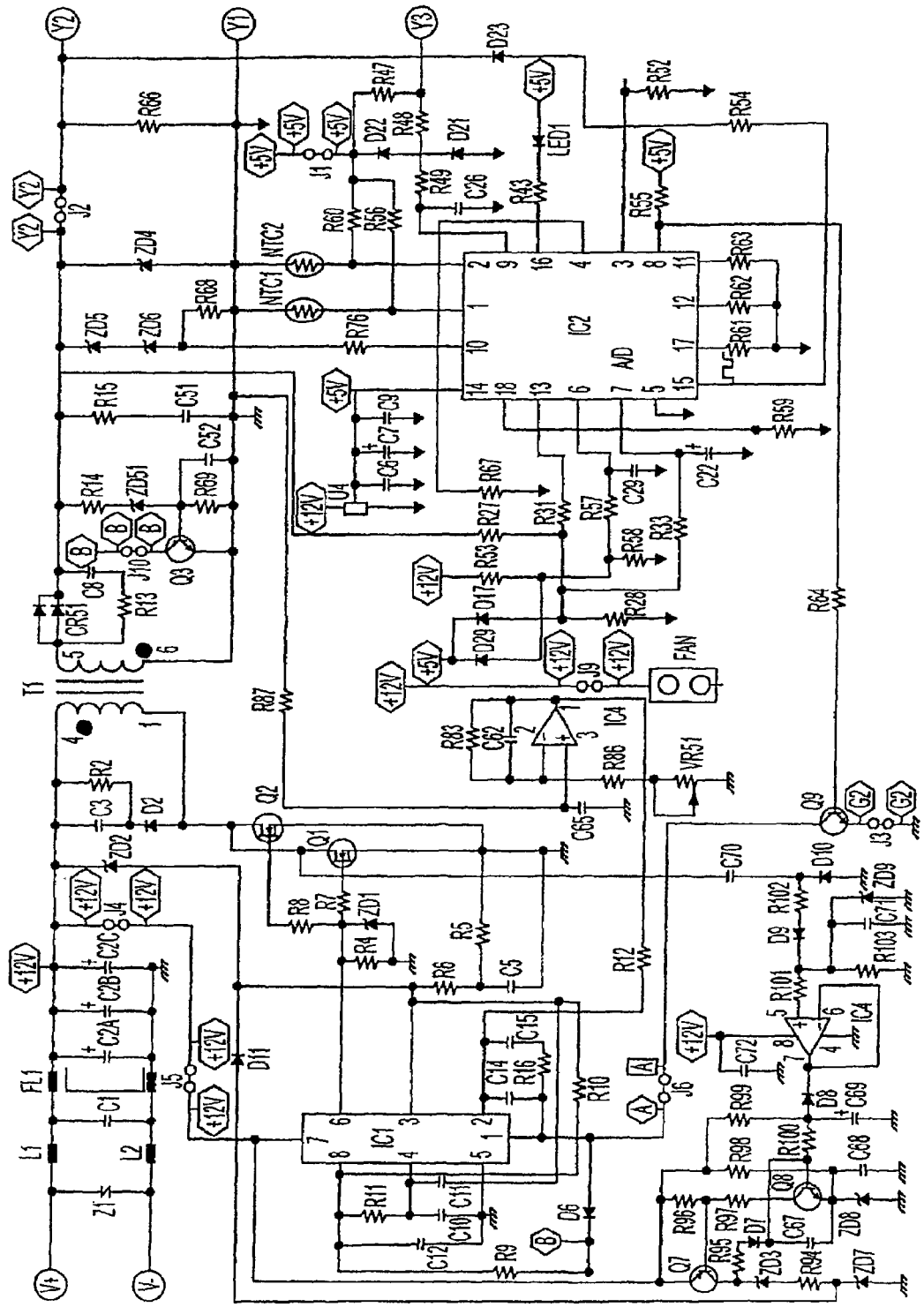
FIG. 3 is a schematic diagram of the charger according to the present invention.

FIG. 3 is an exemplary schematic diagram of the charger of FIG. 1. Preferably, the values of the different components of are as follows:

| | |
|---|---|
| C1 | 0.1 microfarads |
| C2A | 1,000 microfarads |
| C2B | 1,000 microfarads |
| C2C | 1,000 microfarads |
| C3 | 0.1 microfarads |
| C5 | 102 picofarads |
| C6 | 0.1 microfarads |
| C7 | 47 microfarads |
| C8 | 0.001 microfarads |
| C9 | 0.1 microfarads |
| C10 | 0.001 microfarads |
| C11 | 220 picofarads |
| C12 | 0.1 microfarads |
| C14 | 0.01 microfarads |
| C15 | 0.1 microfarads |
| C22 | 1 microfarads |
| C26 | 1 microfarads |
| C29 | 0.1 microfarads |
| C51 | 0.1 microfarads |
| C52 | 0.01 microfarads |
| C62 | 100 picofarads |
| C65 | 0.001 microfarads |
| C67 | 0.01 microfarads |
| C68 | 0.1 microfarads |
| C69 | 47 microfarads |
| C70 | 0.0022 microfarads |
| C71 | 0.22 microfarads |
| C72 | 0.1 microfarads |
| CR51 | Diode FRD T220 STPR1020CT |
| D2 | Diode FRD 1 A 1000 V DO204 BYV26E |
| D6 | Diode SW .3 A 75 V MELF |
| D7 | Diode SW 200 mA 75 V DO-35 |
| D8 | Diode SW .3 A 75 V MELF |
| D9 | Diode SW 200 mA 75 V DO-35 |
| D10 | Diode SW .3 A 75 V MELF |
| D11 | Diode SW .3 A 75 V MELF |
| D17 | Diode SW .3 A 75 V MELF |
| D21 | Diode SW .3 A 75 V MELF |
| D22 | Diode SW .3 A 75 V MELF |
| D23 | Diode SW 200 mA 75 V DO-35 |
| D29 | Diode SW .3 A 75 V MELF |
| FL1 | LF 780 microhenries |
| IC1 | UC3845BN |
| IC2 | Microprocessor |
| IC4 | LM358 |
| L1 | 1.1 microhenries |
| L2 | 1.1 microhenries |
| NTC1 | thermistor, 100K |
| Q1 | FET 60 V 50 A T220 IRFZ44N |
| Q2 | FET 60 V 50 A T220 IRFZ44N |
| Q3 | MMBT4401 SMT |
| Q7 | MMBT4403 SMT |
| Q8 | MMBT4401 SMT |
| Q9 | MMBT4401 SMT |
| R2 | 47 kiloohms |
| R4 | 5.1 kiloohms |
| R5 | 3 kiloohms |
| R6 | 1 kiloohms |
| R7 | 33 ohms |
| R8 | 33 ohms |
| R9 | 1 kiloohms |
| R10 | 43 kiloohms |
| R11 | 12 kiloohms |
| R12 | 220 kiloohms |
| R13 | 100 ohms |
| R14 | 18 kiloohms |
| R15 | 2.2 ohms |

-continued

| | |
|---|---|
| R16 | 220 kiloohms |
| R27 | 80.6 kiloohms |
| R28 | 14 kiloohms |
| R31 | 47.5 kiloohms |
| R33 | 39 kiloohms |
| R43 | 470 ohms |
| R47 | 8.25 kiloohms |
| R48 | 8.2 kiloohms |
| R49 | 10 kiloohms |
| R52 | 1 kiloohms |
| R53 | 4.02 kiloohms |
| R54 | 470 ohms |
| R55 | 4.7 kiloohms |
| R56 | 82 kiloohms |
| R57 | 2 kiloohms |
| R58 | 1 kiloohms |
| R59 | 10 kiloohms |
| R60 | 82 kiloohms |
| R61 | 100 kiloohms |
| R62 | 100 kiloohms |
| R63 | 100 kiloohms |
| R64 | 470 ohms |
| R66 | 10 kiloohms |
| R67 | 100 kiloohms |
| R68 | 1 kiloohms |
| R69 | 10 kiloohms |
| R76 | 100 kiloohms |
| R83 | 100 kiloohms |
| R86 | 910 ohms |
| R87 | 1 kiloohms |
| R94 | 330 ohms |
| R95 | 1.2 kiloohms |
| R96 | 1.5 kiloohms |
| R97 | 1.2 kiloohms |
| R98 | 30 kiloohms |
| R99 | 200 kiloohms |
| R100 | 10 kiloohms |
| R101 | 10 kiloohms |
| R102 | 300 ohms |
| R103 | 10 kiloohms |
| T1 | Transformer |
| U4 | Voltage Regulator IC 5 V 0.1 A T92 3PIN 7805 |
| VR51 | Variable Resistor 1 kiloohms |
| Z1 | Varistor 20 VAC 6 J 1000 A |
| ZD1 | Zener Diode 0.5 W 18 B MELF |
| ZD2 | Zener Diode 0.5 W 20 B MELF |
| ZD3 | Zener Diode 0.5 W 6.2 B MELF |
| ZD4 | Zener Diode P6KE51A |
| ZD5 | Zener Diode 0.5 W 15 B MELF |
| ZD6 | Zener Diode 0.5 W 15 B DO-35 |
| ZD7 | Zener Diode 0.5 W 5.1 C MELF |
| ZD8 | Zener Diode 0.5 W 5.1 C MELF |
| ZD9 | Zener Diode 0.5 W 12 C MELF |
| ZD51 | Zener Diode 0.5 W 36 V RLZTE1139B/TZMB36 MELF |

Persons skilled in the art will recognize that the pulse output PO and input are pins 15 and 7 of IC2, respectively. Persons skilled in the art will also recognize that diode D23 and resistor R54 are the same components in FIGS. 1 and 3.

Persons skilled in the art should recognize that the charger shown in FIG. 3 is connectable to a vehicle battery, rather than to an AC source. Nevertheless, persons skilled in the art will know how to modify the power supply within the charger to accept power from an AC source.

Finally, persons skilled in the art may recognize other additions or alternatives to the means disclosed herein. However, all these additions and/or alterations are considered to be equivalents of the present invention.

What is claimed is:

1. A charger comprising:
   a controller having an input and an output;
   a first terminal for connecting a battery pack to the controller;

a connecting line disposed between the first terminal and the input of the controller;

a current source connected to the controller for providing power to the battery pack, the current source providing the power to the battery pack via the connecting line;

wherein the controller sends a pulse signal unto the connecting line to the battery pack via the output, whereby the controller determines whether the battery pack is connected to the charger by the presence of the pulse signal in the input of the controller.

2. The charger of claim 1, wherein the charger is connectable to a vehicle battery.

3. The charger of claim 1, wherein the charger is connectable to an AC source.

4. A charger/battery pack combination comprising:
a battery pack;
a charger for charging the battery pack comprising:
a controller having an input and an output;
a first terminal for connecting the battery pack to the controller;
a connecting line disposed between the first terminal and the input of the controller;
a current source connected to the controller for providing power to the battery pack, the current source providing the power to the battery pack via the connecting line;
wherein the controller sends a pulse signal unto the connecting line to the battery pack via the output, whereby the controller determines whether the battery pack is connected to the charger by the presence of the pulse signal in the input of the controller.

5. The charger/battery pack combination of claim 4, wherein the charger is connectable to a vehicle battery.

6. The charger/battery pack combination of claim 4, wherein the charger is connectable to an AC source.

7. A method for detecting whether a battery pack is connected to a charger, the method comprising:
providing the charger a controller having an input and an output, a first terminal for connecting the battery pack to the controller, a connecting line disposed between the first terminal and the input of the controller, a current source connected to the controller for providing power to the battery pack, the current source providing the power to the battery pack via the connecting line;
turning off the current source;
after turning off the current source, sending a pulse signal unto the connecting line to the battery pack via the output; and
detecting a presence of the pulse signal in the input of the controller.

8. The method of claim 7, further comprising turning on the current source if the pulse signal is not detected.

9. The method of claim 7, further comprising sensing a voltage of the battery pack.

10. The method of claim 9, further comprising comparing the voltage to a predetermined threshold.

11. The method of claim 10, further comprising stopping a charging process if the voltage exceeds the predetermined threshold.

12. The method of claim 10, further comprising continuing a charging process if the voltage is below the predetermined threshold.

13. The method of claim 10, wherein the predetermined threshold is at least 30 volts.

* * * * *